United States Patent [19]

Schürmann et al.

[11] Patent Number: 5,015,869
[45] Date of Patent: May 14, 1991

[54] DYNAMO FOR/ON BICYCLES

[76] Inventors: Dieter Schürmann, Lessing Strasse 2, 4800 Bielefeld 1; Bernd Gudereit, Hörster Strasse 30, 4800 Bielefeld 18, both of Fed. Rep. of Germany

[21] Appl. No.: 196,194
[22] PCT Filed: Jun. 25, 1987
[86] PCT No.: PCT/EP87/00339
§ 371 Date: Nov. 17, 1988
§ 102(e) Date: Nov. 17, 1988
[87] PCT Pub. No.: WO88/00549
PCT Pub. Date: Jan. 28, 1988

[30] Foreign Application Priority Data

Jul. 12, 1986 [DE] Fed. Rep. of Germany ....... 3623605
Oct. 22, 1986 [EP] European Pat. Off. ............... 253019

[51] Int. Cl.⁵ .............................................. H02K 7/18
[52] U.S. Cl. ................................................... 290/1 R
[58] Field of Search ................... 290/1 R, 1 C; 322/1

[56] References Cited

U.S. PATENT DOCUMENTS 1,111,864  9/1914  Sanladerer ...................... 322/1 X
4,555,656 11/1985  Ryan .............................. 322/1 X

FOREIGN PATENT DOCUMENTS 681248   8/1939  Fed. Rep. of Germany .
749209   4/1944  Fed. Rep. of Germany .
855264   5/1940  France .
1274615  9/1961  France .
224818   4/1943  Switzerland .

Primary Examiner—A. D. Pellinen
Assistant Examiner—W. E. Duncanson, Jr.
Attorney, Agent, or Firm—Sprung Horn Kramer & Woods

[57] ABSTRACT

The dynamo for/on bicycles comprises a housing (1) which can be secured to the bicycle and accommodates a stator (2) and a rotor (3); the rotor (3) can be set in rotary motion by a drive member (4), which can be driven by a bicycle wheel.

The drive member (4) is mounted rotatably around a wheel axle (6) so as to be kinematically connectable with the wheel and forms part of an engageable and disengageable dynamo gearing (7) which rotates the rotor (3) in dependence on the rotation of the wheel.

The dynamo is arranged with its drive member (4) coaxial to the wheel axle (6) and mounted torsionally securely on the wheel axle (6), the stator (2) and rotor (3) lying in eccentric relation to the wheel axle (6).

The drive member (4) formed as a rotary housing cover has an engaging and disengaging member (22) with a driver (38) which can be pushed between the wheel spokes for transmission of the movement.

15 Claims, 4 Drawing Sheets

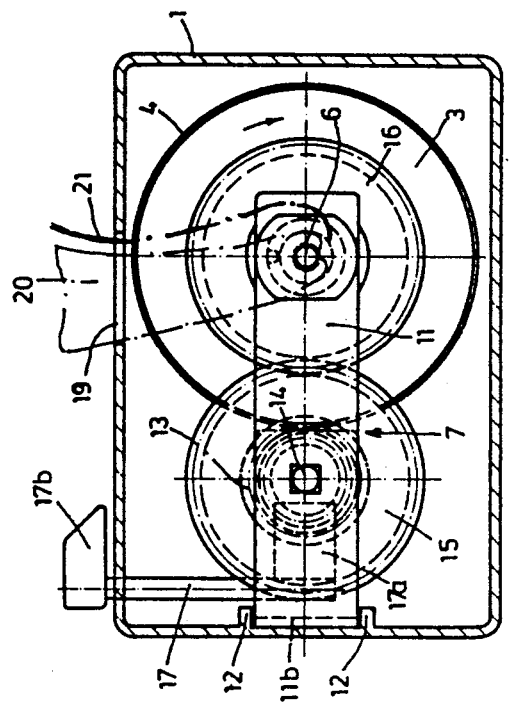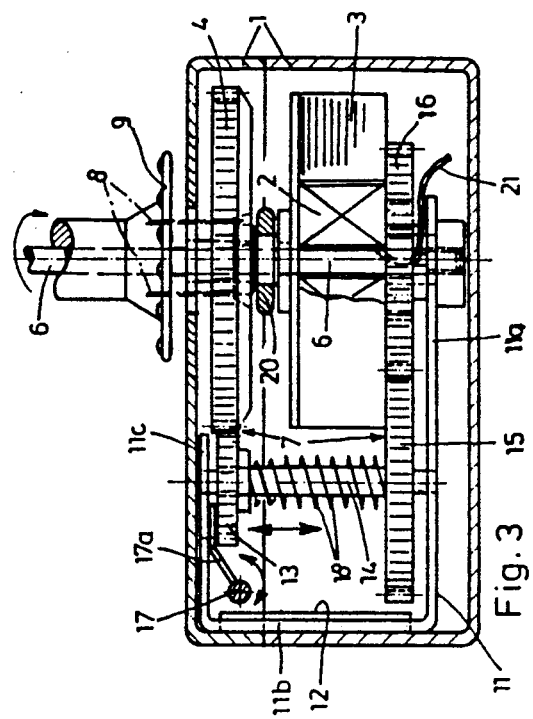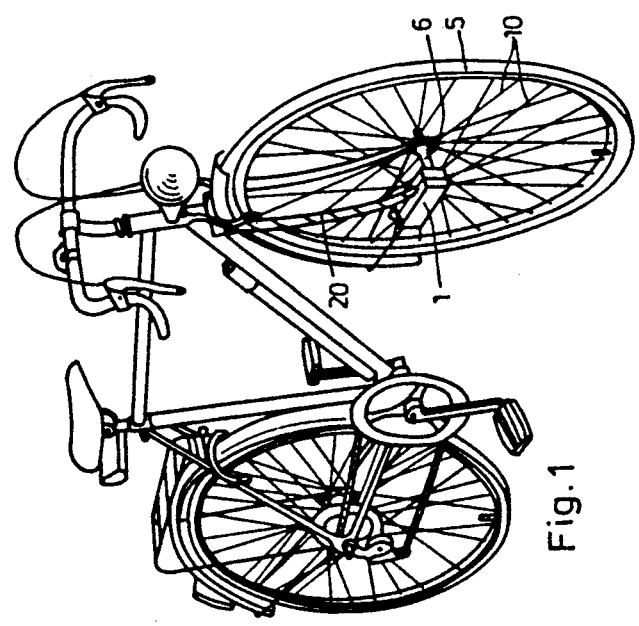

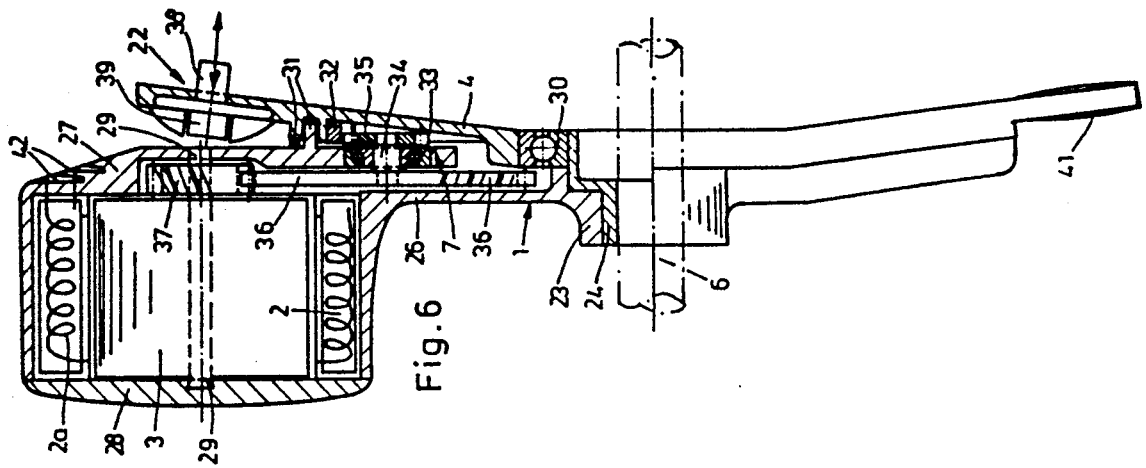
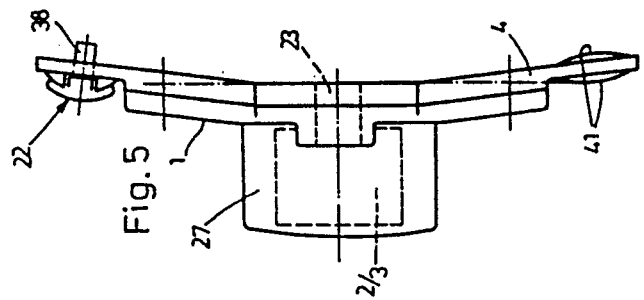
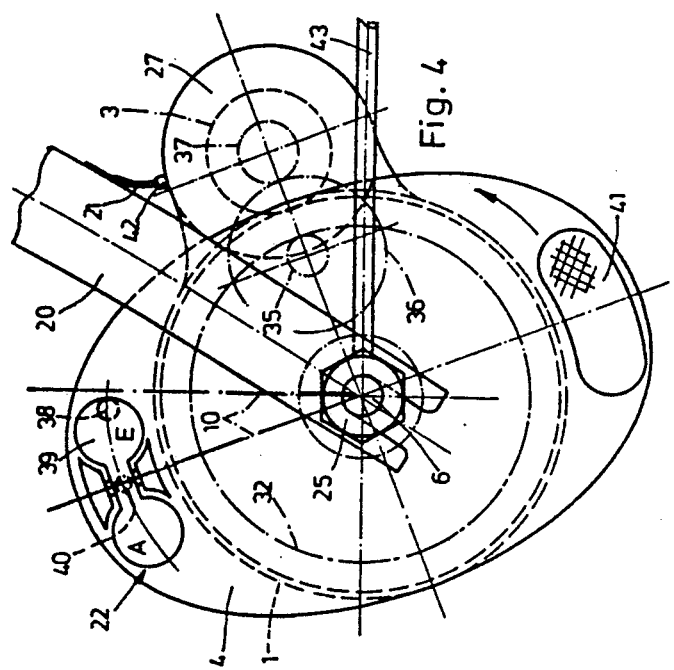

DYNAMO FOR/ON BICYCLES

BACKGROUND OF THE INVENTION

The invention relates to a dynamo for/on bicycles, comprising a housing receiving a stator and a rotor and securable to a bicycle, a drive member setting the rotor in rotary motion and being driven by a bicycle wheel.

Known dynamos of this type are attached to the bicycle fork and have a small wheel as a drive member, which rolls against the tire. The disadvantage thereof is that frequently rotation of the small wheel does not occur because of dirt or because of snow and ice, but rather the small wheel slips against the tire, so that no current can be generated. The possibility also arises of the fastening of the dynamo to the wheel fork becoming loose and the dynamo then getting between the spokes, which leads to accidents.

Furthermore, dynamos are known, which comprise a wide pressure roll, which also rolls against the tire. The same disadvantages of slip and a shortage of current generation also arise here.

Moreover, the drive members' rolling against the tire can damage the tire with prolonged use.

The problem on which the invention is based is that of providing a simply and economically constructed dynamo, which, on the one hand, can be attached securely to the bicycle and, on the other hand, achieves consistently certain and optimum transmission of motion from the bicycle wheel, but not from the tire, for current generation.

SUMMARY OF THE INVENTION

This problem is solved according to the invention by the characterizing features of claim 1, the design features given in the subclaims also representing advantageous developments of the solution to the problem.

The subject matter of the invention extends not only to the features of the individual claims, but also to combinations thereof.

The dynamo according to the invention is simply and economically constructed and can be attached simply and securely to the bicycle. The dynamo is mounted in a preferred way on a wheel axle, preferably the front wheel axle, of the bicycle and then effectively represents an axle dynamo.

For the transmission of the rotary motion from the wheel to the rotor a drive member, preferably a gear wheel or revolving housing cover, is mounted centrally on the wheel axle and connected firmly to the wheel or connectable kinematically to the wheel spokes by means of an engaging and disengaging mechanism, and this drive member delivers its rotary motion, determined by the wheel movement, via gearing to the rotor, which lies in coaxial or eccentric relation to the wheel axle, so that the transmission of the rotary motion occurs away from the tire and is consequently not impaired by outside influences, such as dirt, snow or ice, since no slipping or sliding movements can arise because of the torsionally secure connection of the drive member and the wheel.

The drive member, gearing, stator and rotor are accommodated in an externally sealed housing and form a compact structural unit with the housing.

The dynamo can be carried torsionally securely on the bicycle by being mounted on the wheel axle in connection with the wheel fork. Moreover, it is also possible for the dynamo to be mounted away from the wheel axle on the wheel fork, its gearing then also being connected to the drive member seated on the wheel axle.

The dynamo can easily be added without difficulty to any bicycle.

BRIEF DESCRIPTION OF THE DRAWINGS

Exemplary embodiments according to the invention are described in more detail below with the aid of drawings, in which:

FIG. 1 shows a perspective view of a bicycle with a dynamo arranged on the front wheel axle, FIG. 2 shows a vertical section through the dynamo arranged on the wheel axle, FIG. 3 shows a horizontal section through the same dynamo, FIG. 4 shows a side view of another embodiment of a dynamo in position mounted on the front wheel axle, FIG. 5 shows a front view of the dynamo according to FIG. 4, FIG. 6 shows a vertical half section through the same dynamo.

DETAILED DESCRIPTION OF THE INVENTION

Figure 7:
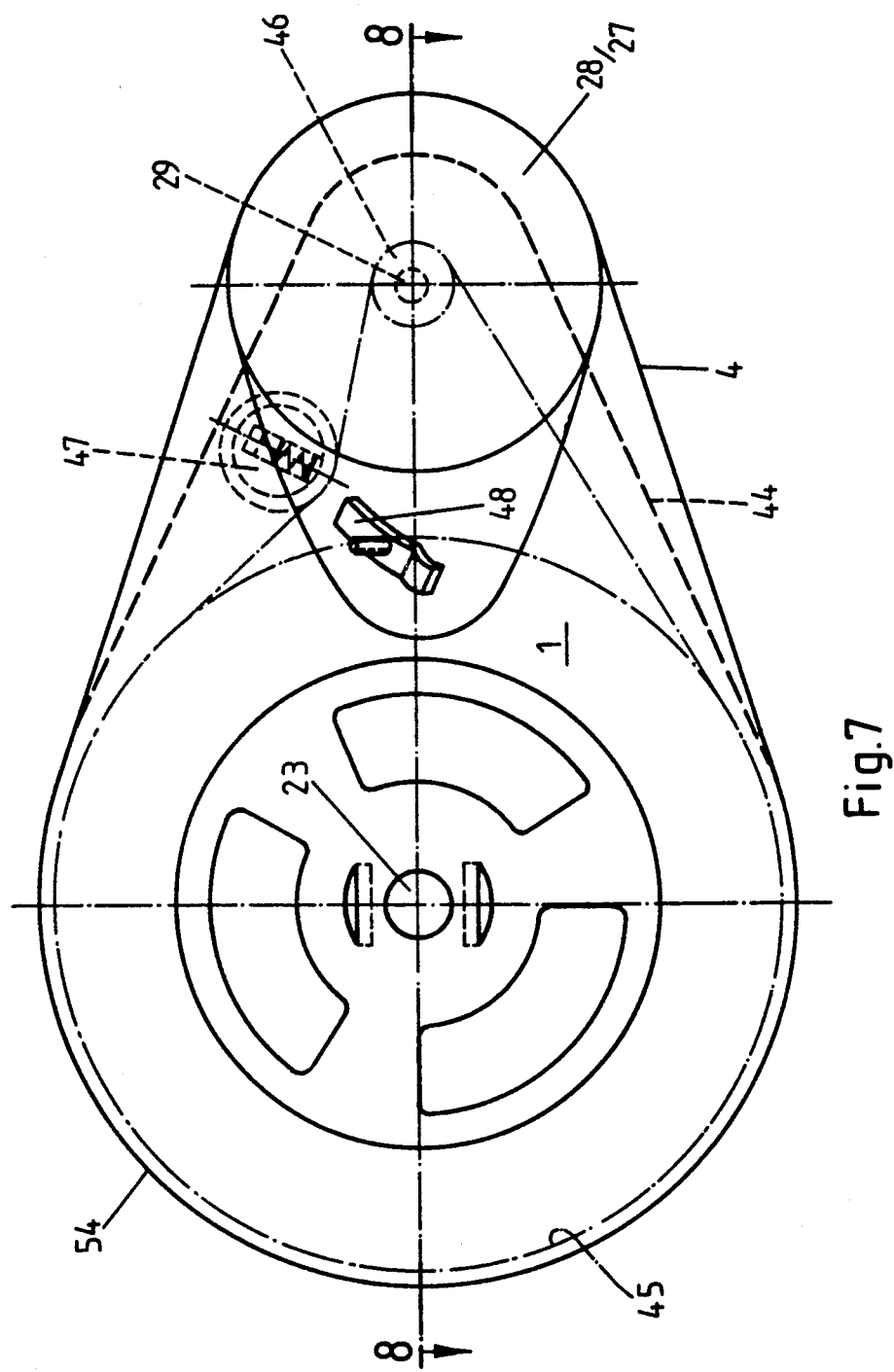
FIG. 7 shows a lateral view of a dynamo in another embodiment.

The housing of a dynamo for/on bicycle wheels is given the reference numeral 1 and accommodates a stator (2) and a rotor (3) coaxial or eccentric to a wheel axle (6), preferably the front wheel axle, the rotor (3) being set in rotary motion by a drive member (4) and this drive member (4) receiving its rotary motion from a bicycle wheel (5).

The drive member (4) is mounted rotatably around the wheel axle (6) in fixed connection with or immovably connectably with the wheel (5) and forms part of an engageable and disengageable dynamo gearing (7) which rotates the rotor (3) in dependence on wheel rotation.

Hereinafter reference is made to the embodiment according to FIGS. 2 and 3, in which the dynamo, with its stator (2), rotor (3) and drive member (4) is arranged coaxially with the wheel axle (6) and the whole dynamo sits on the wheel axle (6).

The gearing (7) may be spur gearing, bevel gearing or planetary gearing provided in the housing (1), the drive member (4) always forming part of this gearing and being connected torsionally securely with the wheel (5) in the area of the axle (6).

The drive member (4) formed in this embodiment as a toothed wheel is mounted centrally on the wheel axle (6) and connected to the wheel (5) by drivers (8); the drivers (8) may be screws, for example, which are screwed into the hub flange (9), or fingers are provided on the drive member (4), which engage in the hub flange or between the spokes (10).

In the embodiment according to FIGS. 2 and 3 spur gears (7) are provided in the housing (1) and also a U-shaped bearing bracket (11) with U-legs of different lengths (11a, 11c) is mounted around the wheel axle (6) by at least one leg (11a), preferably the longer, and is held torsionally securely in the housing (1); for example the U-shaped bearing bracket (11) lies with its web (11b) between two strips (12) formed on the housing (1).

A driven gear wheel (13) is mounted rotatably on the shorter U-leg (11c) of the bearing bracket (11) and meshes with the drive member (4). The axle (14) of the driven gear (13) is continued as far as the longer leg (11a) and on this axle (14), near the leg (11a), is arranged a transmission gear (15), which is in engagement with a gear wheel (16) which is provided on or around the rotor (3), the gear wheel (16) and consequently the rotor (3) being rotated by the drive member (4) via the driven gear (13) and the transmission gear (15), in a specific transmission ratio.

The driven gear (13) is mounted rotatably by means of the axle (14) and at the same time displaceably on the axle (14), so that in one displacement position it is in engagement with the drive member (4) and in the second displacement position it is out of engagement—this displaceability of the driven gear (13) enables the engagement and disengagement of the gearing (7) and consequently the transmission of rotary motion from the wheel (5) to the rotor (3) and the interruption thereof. The displacement of the driven gear (13) is effected by a rotary or rocking lever (17) projecting out of the top of the housing (1); for example, in FIGS. 2 and 3 a rocking lever (17) is shown, which is connected by an eccentric tongue (17a) to the driven gear (13). When rotated this tongue (17a) effects a displacement of the gear wheel (13).

An actuating button (17b) is provided on the rotary lever (17), at the end lying outside the housing (1).

A compression spring (18) arranged around the axle (14) is supported between the two gear wheels (13) and (15) and holds or brings the gear wheel (13) into the engaged transmission position.

The housing (1) is preferably made in two parts of plastics material and has a streamlined shape. At the top of the plastics housing an aperture (19) is provided through which a strut of the wheel fork (20) reaches inside the dynamo and is fastened to the wheel axle. The strut of the wheel fork (20) lies between the drive member (4) and the rotor (3).

Reference numeral 21 is allocated to an electric cable, which is taken from the stator (2) out of the dynamo, preferably through the aperture (19) and connected to the bicycle lights, to supply them with power.

The fact that the wheel fork (20) reaches into the housing (1) enables the whole dynamo to be held torsionally securely on the wheel axle.

It is also within the scope of the invention to secure the dynamo away from the wheel axle (6), e.g. on the wheel fork (20), the drive member (4) then being seated on the wheel axle (6) and the driven gear (13) then also being connected to the drive member (4). In this embodiment the stator (2) and rotor (3), as well as the gear wheel (16), would then no longer be coaxial with the wheel axle (6) but eccentric therewith.

In the other exemplary embodiment according to FIGS. 4 to 6, which corresponds with the first embodiment in basic principle and in operation, the housing (1) for the gearing (7) is similarly arranged fixedly on the wheel axle (6), the stator (2) and rotor (3) lie in eccentric relation to the wheel axle (6) in the housing (1) and the drive member (4) is formed of a revolving housing cover, which can be kinematically connected to and released from the wheel (5) by an engaging and disengaging member (22).

The housing (1) forms a receiving housing for the stator (2) and rotor (3) and at the same time for the gearing (7). In addition, this housing (1) comprises a bearing bush (23), with which it is mounted, preferably pressed, on a receiving bushing (24) seated on the wheel axle (6) and is held torsionally securely by the wheel axle nut (25).

A basically circular, dish-shaped housing part (26) lying in coaxial relation to the wheel axle (6) extends around the bearing bushing (23), and has connected to it a cup-shaped housing part (27) comprising a cover (28) and lying in eccentric relation to the wheel axle (6).

In the cup-shaped housing part (27) are housed the stator (2) with winding (2a) and the rotor (3), which is mounted rotatably on the one hand with its rotor shaft (29) in the cover (28) closing the housing part and on the other hand in the housing part (27).

The drive member (4) has an oval basic form, is mounted rotatably around the receiving bushing (24) with an antifriction and/or sliding bearing (30) therebetween and tightly seals the housing part (26) with a rotary seal (31), such as a rubber and labyrinth seal.

An internally toothed ring gear (32) is attached to the drive member (4) and is preferably straight-toothed.

A shaft (34) is mounted in the housing part (26), with the interposition of an antifriction and/or sliding bearing (33), which shaft (34) rotatably holds a preferably straight-toothed gear wheel (35), which meshes with the ring gear (32), and a second gear wheel (36) arranged in coaxial relation to the gear wheel (35), this second, larger gear wheel (36) being in engagement with a gear wheel (37) seated on the shaft (29) of the rotor (3). The two gear wheels (36, 37) are preferably provided with helical teeth.

The engaging and disengaging member (22) is arranged in/on an oval longitudinal end area of the drive member (4) and has a bolt-shaped driver (38) running approximately parallel to the wheel axle (6) and attached to a switching rocker (39) mounted in the drive member (4) and having engaging and disengaging push buttons (E, A), and preferably to the engaging button (E) away from the switching rocker swivelling axis.

The driver (38) effects the kinematic connection of the drive member (4) with the spokes (10) and the rotary motion of the gearing (7) is thereby initiated via the revolving drive member (4). By pressure with the finger on the engaging button (E) in the axial direction in relation to the wheel axle (6), the driver (38) is pushed between the spokes (10) and on rotation of the wheel (5) the driver (38) is driven and the drive member (4) consequently rotated.

The gear ring (32) which rotates with the drive member (4) drives the fixed gear wheel (35) and this in turn drives the gear wheel (36) via the common shaft (34), the gear wheel (36) then rotating the gear wheel (37) seated on the rotor shaft (29) and consequently the rotor (3).

The gearing (7) is effected in two stages and has a transmission ratio of e.g. $R_{overall}=31$.

By pressure with the finger on the disengaging button (A), the driver (38) is withdrawn from the spokes (10) and then the dynamo is completely separate from the front wheel (5) (from its spokes 10).

The respective switch position "in" or "out" is blocked by a spring-loaded plunger pin (40) or the like in a locking slot.

A reflector (41) is arranged at the oval longitudinal end area of the drive member (4) opposite the engaging and disengaging member (22). This reflector (41) and the switching rocker (39), which is preferably also reflecting, form two revolving points of light, which contribute to the safety of the cyclist.

The connecting cables of the dynamo are inserted in the form of two plugs (42) into the stationary housing (1) (housing part (27)) and are connected with the power cables (21), which lead to the front and rear lights.

The receiving bushing (24) has the task of positioning the dynamo on the axle of the front wheel (5) torsionally securely and centrally.

During assembly the dynamo or the inserted receiving bushing (24) can, with few movements, be mounted on the wheel axle (6), adjusted between the bicycle fork (20) and the lower mudguard holding bar (43) and thereafter tightened with the nut (25) provided therefor on the front wheel axle (6). Then the dynamo is seated in the protected area between the bicycle fork (20) and the spokes (10), without being in contact with these (FIG. 4).

The protrusion of the stationary housing (1), i.e. the housing part (27) for the stator (2) and the rotor (3), remains within the length of the front wheel axle provided by the bicycle manufacturer.

The housing (1) and the drive member (4), as well as the gear wheels (32, 35, 36, 37) are made of plastics material.

In FIG. 6 the drive member (4) is shown with its driver (38) in the rotated position, when the driver (38) lies in the region of the stator (2) and the rotor (3), i.e. rotated by 270° in relation to FIG. 4.

Figure 8:
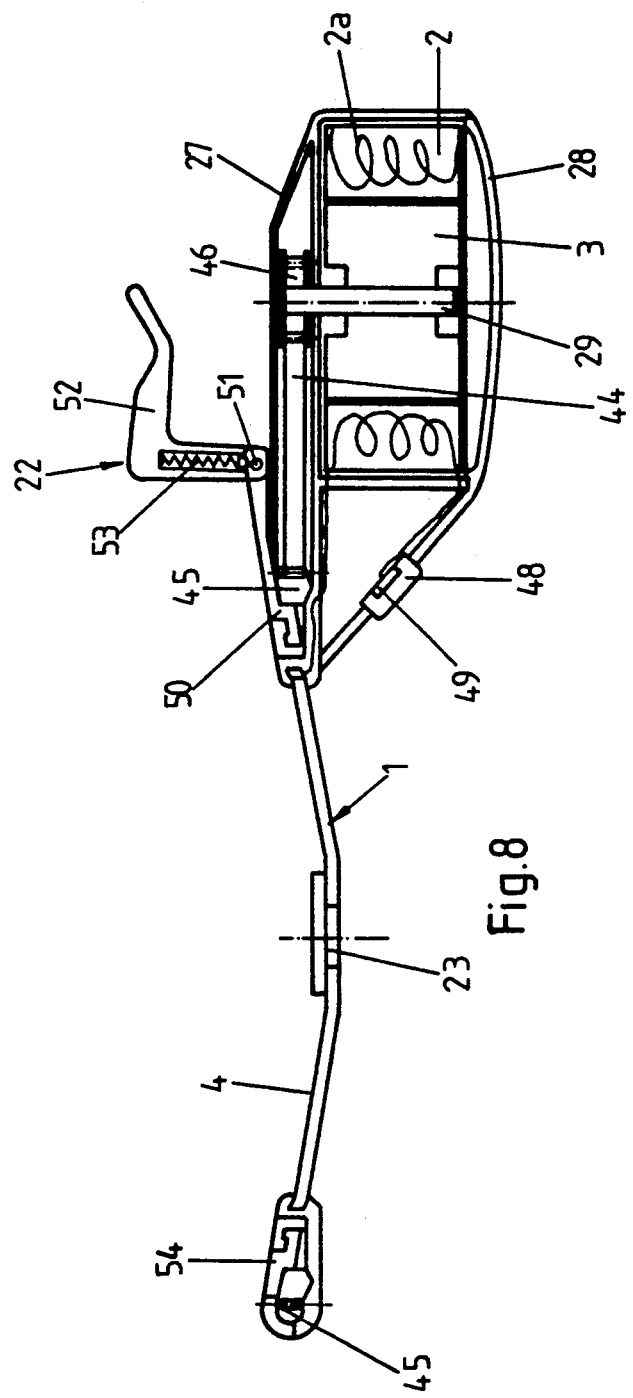
FIG. 8 shows a section through the dynamo according to the sectional line I—I in FIG. 7.

The third embodiment of the dynamo, illustrated in FIGS. 7 and 8, corresponds in principle and design to that illustrated in FIGS. 4 and 6, and the same reference numbers are assigned to the equivalent parts.

The essential difference is the use of a wraparound drive mechanism (44–47) instead of a gear wheel.

The housing (1), preferably a steel-bodied base bracket, is again secured to the wheel axle (6) by means of a bearing bush (23). Extending around the bush and inside the housing is a large toothed-belt disk (45). A small toothed-belt disk (46) rests on the rotor shaft (29). Extending around the belt disks is a toothed belt (44) that is subject to tension from a tensioning pulley (47).

The drive member (4) is basically oval in shape, with the housing part (27) and cover (28) at the smaller end and accommodating the stator (2) and rotor (3), the small toothed-belt disk (46) and tensioning pulley (47), and a connector flap (48) with a connector (49) for the power cable (21).

The engaging and disengaging member (22) is mounted on a bracket (50) positioned on the housing part (27) and has a driver (52) that pivots around a shaft (51) in conjunction with a system (53) of spring-loaded notches.

The large toothed-belt disk (45) extends around the bearing bush (21) inside a plastic housing ring (54), onto which it is extruded and which merges into the housing part (27), constituting an integrated unit with it.

The operation of the bicycle dynamo is initiated by means of the engaging and disengaging member (22), by inserting the driver (52) between the spokes (10). When the dynamo is out of operation, the wheel (5) rotates freely, as in the normal state, without additional load.

When the engaging and disengaging member (22) encounters a compression spring (53) that allows only the "on" or the "off" position between two designated positions. The driver bracket (50) is connected to both the engaging and disengaging member (22) and to the large toothed-belt disk (45), the rotation of which is initiated by these two components.

The toothed belt (44) drives the small toothed-belt disk (46) and hence the rotor (3). The transmission ratio is i=10.

The power cable (21) for the headlight and taillight is connected into the dynamo circuit by way of the connector flap (48), which can be folded up.

The system is mounted by removing a lock nut from the hub of the wheel and a washer from the wheel axle (6) (hub).

The bicycle dynamo as a whole can then be slid onto the wheel axle (6). The dynamo is then secured to the axle with the previously removed lock nut. Assembly continues by conventionally mounting the wheel (5) in the wheel fork (20) by tightening the nuts.

What is claimed is:

1. A dynamo for/on bicycles, with a housing which can be secured to the bicycle and which receives a stator and a rotor, the rotor being set in rotary motion by a drive member which is driven by a bicycle wheel, wherein a drive member (4) is mounted rotatably around a wheel axle (6) so as to be capable of kinematic connection with the wheel (5) and forms part of an engageable and disengageable dynamo gearing (7) which rotates the rotor (3) in dependence on wheel rotation, wherein on a bearing bracket (11) held torsionally securely in the housing (1) and mounted around the wheel axle (6) the gearing (7) comprises a driven gear (13), which is in engagement with the drive member (4) and can be moved out of engagement therewith by an actuating component (17), and a transmission gear (15) arranged coaxially thereto and coupled rotatably with the driven gear (13), which transmission gear (15) meshes with a gear wheel (16) arranged fixedly on or around the rotor (3), the driven gear (13) and the transmission gear (15) being mounted rotatably on a common shaft (14) and this shaft (14) being mounted between two legs (11a, 11c) of different lengths of the bearing bracket (11) and the bearing bracket (11) being mounted with its longer leg (11a) around the wheel axle (6) and being fixed in position by its U-web (11b) between two strips (12) formed on the housing (1).

2. A dynamo according to claim 1, wherein the driven gear (13) is mounted displaceably on the shaft (14) and can be brought into the gear engagement or gear disengagement position by the actuating component (17) formed of a rotary or rocking lever, a compression spring (18), which holds the driven gear (13) in the gear engagement position and brings it thereinto, being arranged between the driven gear (13) and the transmission gear (15) around the shaft (14).

3. A dynamo according to claim 2, wherein the housing (1) is attached to the wheel fork (20) away from the wheel axle (6) and the driven gear (13) is connected to the drive member (4) seated on the wheel axle (6).

4. A dynamo for/on bicycles, with a housing which can be secured to the bicycle and which receives a stator and a rotor, the rotor being set in rotary motion by a drive member which is driven by a bicycle wheel, wherein a drive member (4) is mounted rotatably around a wheel axle (6) so as to be capable of kinematic connection with the wheel (5) and forms part of an engageable and disengageable dynamo gearing (7) which rotates the rotor (3) in dependence on wheel rotation, wherein the dynamo gearing comprises a wraparound drive mechanism is accommodated in the housing (1) and has a large toothed-belt disk (45) extruded into a housing ring (54), a small toothed-belt disk (46) mounted on a rotor shaft (29) in the housing part (27), which is integrated into a single unit with the housing ring (54), and a toothed belt (44) that extends around both disks and is subject to a tensioning pulley (47) (FIGS. 7 and 8).

5. A dynamo according to claim 4, wherein the stator (2) and rotor (3), as well as the drive member (4) are coaxial to the wheel axle (6).

6. A dynamo according to claim 5, wherein the drive member (4) is part of a spur gearing, a bevel gearing or a planetary gearing.

7. A dynamo according to claim 6, wherein the drive member (4) formed by a gear wheel is mounted centrally on the wheel axle (6) and connected torsionally securely to the wheel (5) by drivers (8), such as screws engaging in the hub flange (9) or fingers gripping into the hub flange (9) or between the spokes (10).

8. A dynamo according to claim 4, wherein the stator (2) and rotor (3) are mounted in the housing (1) eccentrically in relation to the wheel axle (6).

9. A dynamo according to claim 8, wherein the housing (1) comprises a dish-shaped housing part (26) mountable torsionally securely with a central bearing bushing (23) on an axle-side receiving bushing (24) and a cup-shaped housing part (27) for the stator (2) and rotor (3) formed eccentrically on the dish-shaped housing part (26) and having a cover (28), and that the drive member (24) is formed of a housing cover, which is rotatable around the wheel axle (6) and sealingly covers the dish-shaped housing part (26) with a rotary seal (31), such as a rubber and labyrinth seal, with the interposition of a sliding and/or antifriction bearing (30).

10. A dynamo according to claim 8 or claim 9, wherein in the drive member (4) and the housing part (26) there is arranged a multi-stage, preferably two-stage, gearing (7), an internally toothed gear ring (32) being secured in the drive member (4) and a shaft (34) being rotatably mounted in the dish-shaped housing part (26) by means of sliding and/or antifriction bearings (33), the shaft (34) carrying a first gear wheel (35), which meshes with the gear ring (32), and a second gear wheel (36), which meshes with a gear wheel (37) seated on the rotor shaft (29).

11. A dynamo according to claim 10, wherein the rotor (3) is mounted rotatably on the one hand with its shaft (29) in the housing cover (28) and on the other hand with the gear wheel (37) in the housing part (36) and that the electric cable connections consist of two plugs (42) inserted in the housing part (27).

12. A dynamo according to claim 11, wherein the drive member (4) comprises a rocker-type engaging and disengaging member (22) with a bolt-shaped driver (38) which can be pushed between the spokes (10) of the wheel (5) for the transmission of movement, the engaging and disengaging member (22) being locked in the engaged or disengaged driver position by a locking facility (40).

13. A dynamo according to claim 12, wherein the drive member (4) has an oval basic shape, receives the engaging and disengaging member (22) in one oval longitudinal end area and carries a reflector (41) in the other oval longitudinal end area.

14. A dynamo according to claim 4, wherein the housing (1) accommodating the stator (2) and rotor (3) as well as the gearing (7) is constructed in at least two parts, consists of plastics material and has a streamlined shape.

15. A dynamo according to claim 4, wherein a bracket (50) secured to the large toothed-belt disk (45) is mounted on the housing part (27) and supports an engaging and disengaging member (22) consisting of a driver (52) that pivots around a shaft (51) and is subject to a system (53) of spring-loaded notches (FIG. 8).

* * * * *